United States Patent [19]

Bolser

[11] Patent Number: 4,746,137
[45] Date of Patent: May 24, 1988

[54] TOWING APPARATUS

[76] Inventor: Daniel L. Bolser, 1720 S. State Rte. 133, Blanchester, Ohio 45107

[21] Appl. No.: 6,739

[22] Filed: Jan. 27, 1987

[51] Int. Cl.⁴ ............................................. B60D 1/18
[52] U.S. Cl. .................................... 280/480; 280/457
[58] Field of Search ............... 280/480, 457, 485, 495, 280/503, 460 R, 447, 292, 186, 501, 506

[56] References Cited

U.S. PATENT DOCUMENTS

| | | | |
|---|---|---|---|
| 1,263,622 | 4/1918 | Sutton | 280/480 |
| 1,699,268 | 1/1929 | Atwood | 280/480 |
| 1,845,859 | 2/1932 | Williamson | 280/480 |
| 2,609,214 | 9/1952 | Vos | 280/457 |
| 2,796,183 | 6/1957 | Cline | 280/480 |
| 2,838,325 | 6/1958 | Begin | 280/457 |
| 2,943,591 | 7/1960 | Schneider | 280/480 |
| 3,265,407 | 8/1966 | Paddock | 280/457 |
| 3,269,751 | 8/1966 | Whattoff | 280/457 |

FOREIGN PATENT DOCUMENTS 364428 11/1938 Italy ................................. 280/480

Primary Examiner—David M. Mitchell
Assistant Examiner—Everett G. Diederiks, Jr.
Attorney, Agent, or Firm—Wood, Herron & Evans

[57] ABSTRACT

A towing apparatus to be permanently mounted to a pulling vehicle for use in towing other vehicles. The apparatus has a pair of chains connected to the chassis on opposite sides thereof. The free ends of the chains provide means for connection to the vehicle to be towed. Intermediate the ends of each chain is mounted a resilient lightweight ball of sufficient diameter to prevent the chain from contacting the chassis of the pulling vehicle during either normal use or during the towing of another vehicle. This allows the advantages of permanent connection of pulling chains while minimizing wear and tear on the pulling vehicle.

3 Claims, 1 Drawing Sheet

TOWING APPARATUS

FIELD OF THE INVENTION

This invention relates to towing apparatus and, more particularly, to a towing apparatus which is connected to a four wheel vehicle for pulling or towing another vehicle.

BACKGROUND OF THE INVENTION

In recent years four wheel drive vehicles have experienced a great increase in popularity. These vehicles are noted for their power, their durability and their ability to maintain traction on the road under adverse weather conditions. All of these features prove advantageous in the pulling or towing of other vehicles, a function that is quite necessary under circumstances when a wrecker is unavailable or too expensive.

Although four wheel drive vehicles are quite capable of pulling another vehicle, they are often ill equipped for performing such a service, especially when the need for towing is not anticipated. Thus, connection between the towing vehicle and the towed vehicle is usually made on the spot with whatever can be cobbled up.

For the owner of a four wheel drive vehicle who make occasional tows, each tow will require a suitable connection of the chain to the chassis of the pulling vehicle. In much the same way that a driver replacing a flat tire must correctly place the jack under a location which is suitable for lifting a car, a chain for pulling a vehicle to be towed must be secured to a portion of the chassis which is able to withstand the considerable force required. Even under well lighted conditions, it is sometimes difficult to secure a pulling chain to the underside of the chassis of a pulling vehicle. Difficulties associated with the correct placement and securing of a pulling chain to the underside of a chassis become compounded during night time.

One solution to this problem of on-the-spot connection between the chain and the underside of the chassis of the pulling vehicle might be simply to leave a chain secured in place at all times. However, this would bring about the undesired result of the loose chain banging against the underside of the chassis during the vehicle's movement, and thus this would not be a viable solution.

Once the chain is connected to the pulling vehicle in the position which permits the towing of another vehicle, its subsequent connection to the other vehicle usually causes the chain to grate against the underside of the pulling vehicle. If the chain is tight against the underside of the chassis of the pulling vehicle, turning of the pulling vehicle increases the sliding and grating across the underside of the chassis. If the chain hangs lower than the underside of the chassis to prevent contact during connection, slack in the chain caused by the turning of the pulling vehicle could cause the chain to bang against the underside of the pulling vehicle during towing.

For these reasons, although a four wheel drive vehicle is otherwise well equipped for towing, problems associated with connecting a chain for towing and preventing damage to the pulling vehicle caused by a chain during towing inhibits such use in practice. Thus there has been a need to develop means for performing a suitable and safe connection between the pulling vehicle and trailing vehicle which does not adversely affect the appearance or the normal everyday use of the pulling vehicle, and which is easily attachable.

SUMMARY OF THE INVENTION

The present invention overcomes the above mentioned difficulties in towing a trailing vehicle with a pulling vehicle. In accordance with this invention, two chains are permanently connected to the underside of the chassis of a pulling vehicle, on opposite sides of the chassis. The chains are suitably connected to a portion of the chassis which is able to withstand the force required to pull another vehicle. An opposite end of each of the chains hangs free from the chassis, but the chains are short enough to clear the surface of the ground. A hook or other connection means is located on the lower end of each chain to facilitate further connection of a trailing vehicle. Intermediate the ends of each chain, a cushion or ball is mounted on the chain. This ball is of a diameter which is sufficient to prevent the hook from contacting the underside of the vehicle during movement. Thus, chains for pulling are permanently in place to enable quick connection of a trailing vehicle yet the everyday use of the pulling vehicle is unimpaired because the connected pulling chains neither contact the ground nor the underside of the chassis during movement of the vehicle.

Furthermore, when connection is made to a trailing vehicle for towing purposes, the ball which is mounted on each of the chains prevents the pulling chain from contacting the underside of the chassis of the pulling vehicle. Thus, the banging and/or scraping of a metal chain against the metal underside of a pulling vehicle is prevented.

The above features and advantages of the present invention will be better understood with reference to the accompanying figures in detailed description. It will also be understood that the particular drawings illustrating the invention are exemplary only and not to be regarded as limitations of the invention.

BRIEF DESCRIPTION OF THE DRAWINGS

Reference is made to the accompanying figures which show illustrative embodiments of the present invention from which the novel features and advantages will be apparent.

DETAILED DESCRIPTION OF THE INVENTION

Figure 1:
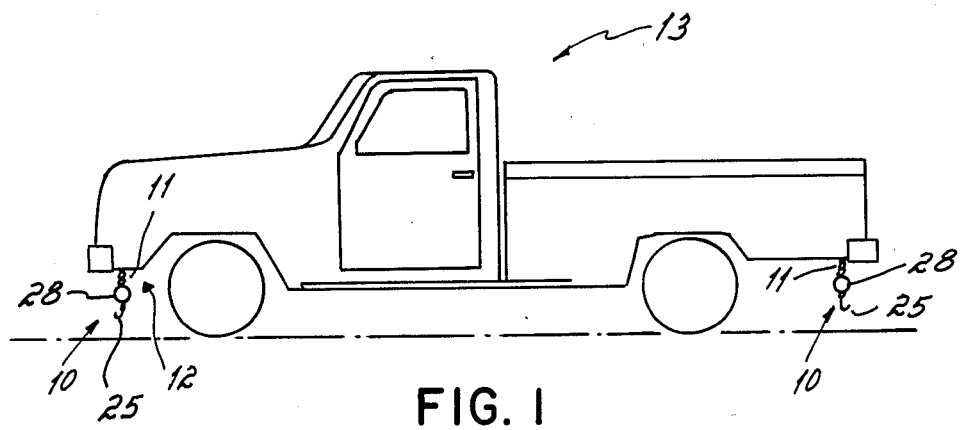
FIG. 1 is a side view of a four wheel drive vehicle having two towing apparatus in accordance with a preferred form of this invention, one mounted adjacent the front end of the vehicle and the other mounted adjacent the rear of the vehicle.

By way of illustrating and providing a more complete appreciation of the present invention and many of the attendant advantages thereof, the following detailed description is given concerning the novel towing apparatus and methods of use thereof.

The towing apparatus 10 of this invention will find advantageous use in any situation where an immobile vehicle must be towed to a suitable location. The towing apparatus can be connected adjacent either the front or the rear of any vehicle which is used to pull another vehicle, and for purposes of explanation is shown in the drawings as being attached adjacent both ends of the vehicle.

Figure 2:
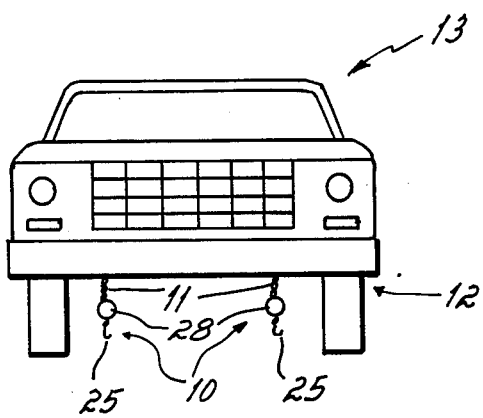
FIG. 2 is a front view of the vehicle shown in FIG. 1.

In the drawings, a towing apparatus 10 of this invention is preferably formed by connecting a pair of chains 11 to the chassis 12 of a pulling vehicle 13 on opposite sides thereof, as shown in FIG. 2. The chains may be made of any material which is suitable to withstand the pulling force between vehicles.

Figure 3:
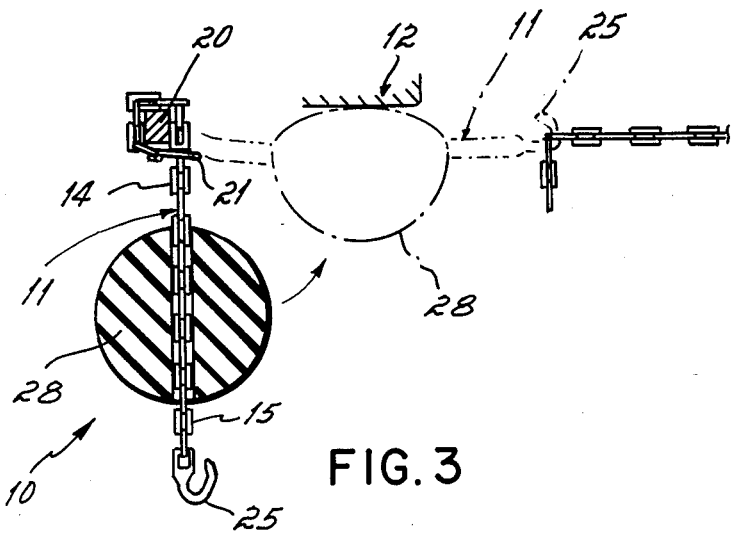
FIG. 3 is a diagrammatic fragmentary view showing the towing apparatus in use.

Each of the chains 11 has a first end 14 connected to the chassis 12 of the pulling vehicle 13, and a second end 15 which hangs down from the chassis 12 but clears the ground. Suitable means for connecting the first end 14 of each chain 11 to the underside of the chassis 12 may include any type of connection which is able to withstand the pulling force of a trailing vehicle without becoming disconnected or sliding laterally with respect to the pulling vehicle 13. Furthermore, the first end 14 of the chains 11 may be connected to the chassis 12 at a bumper or axle or any convenient point which is able to withstand the towing force. FIG. 3 shows one of the chains 11 wrapped around a Reese hitch 20 and secured to itself with a pelican hook 21.

The length of the chain used depends upon the clearance between the ground and the underside of the chassis of the pulling vehicle. The clearance distance will vary depending on the type of pulling vehicle, i.e., a truck on lifts will have a greater clearance. The chains are of a length so as normally to avoid contact between the bottom end of the chain and the ground when the pulling vehicle is either stationary or moving.

FIG. 1 also shows the second end 15 of each of the chains 11 with a steel hook 25 for connecting the safety chain which is subsequently connected to the trailing vehicle. It is to be understood that the purposes and advantages of the invention will be realized with any suitable connection between the second end 15 of each of the chains 11 and the trailing vehicle, and that the steel hook 25 of FIG. 1 is not necessarily required.

A ball 28 is mounted intermediate the ends of each of the chains 11. Preferably, this ball 28 is mounted nearer to the second end 15 of the respective chains 11 and the chain passes through a hole in the ball 28. The ball 28 may be made of rubber or other lightweight resilient material which will cushion impact with the underside of the chassis 12. Each ball is also of a diameter (for example, 6-12") which is sufficient to prevent the hook 25 from contacting the underside of the chassis 12 during movement of the pulling vehicle 13. Thus, the towing apparatus of this invention may be connected to the underside of the chassis 12 of a pulling vehicle 13 and allowed to remain in such position permanently, whether or not a tow is required. Then, when a tow is required, the chains 11 are already conveniently secured in place to allow the safe and easy connection of a trailing vehicle. This alleviates the need to search underneath the chassis 12 for a suitable point to secure the chassis 11 of a pulling vehicle 13 prior to connecting a trailing vehicle under less than favorable conditions, i.e. along the side of the road during night time, fog, rain, snow, etc.

Besides aiding the connection of a pulling vehicle to a trailing vehicle, the towing apparatus of this invention prevents the occurrence of adverse towing effects upon the underside of the chassis of the pulling vehicle. Frequently, a chain which is connected for towing a trailing vehicle will slide against the underside of the chassis of the pulling vehicle resulting in nicks, scrapes, dents and the like. This banging and/or scraping increases as the terrain becomes more rugged. Turning of the pulling vehicle also causes scraping of the pulling chain against the chassis and is alleviated by the towing apparatus of this invention.

It should be appreciated that the towing apparatus of this invention permits variations in the connections between pulling vehicles and trailing vehicles. Although it works best when the pulling vehicle is a high-rise, four wheel drive vehicle, this invention will prove advantageous for any four wheel vehicle used to tow another vehicle. The present embodiments are, therefore, to be considered in all respects as illustrative and not restrictive of any changes coming within the scope of the appended claims.

What is claimed is:

1. Towing apparatus comprising:
    a vehicle having a chassis;
    at least one pair of chains, each of said chains having a first end and a second end;
    means securing the first ends of said chains to the chassis of said vehicle on opposite sides thereof adjacent and inward of at least one end of the vehicle;
    a hook connected to the second end of each of said chains, the length of the chains being such that each of said hooks normally clears the surface of the ground when the chain hangs from the vehicle, but the hook may project outwardly beyond the front or rear end of the vehicle for towing; and,
    a resilient, lightweight ball mounted on each of said chains intermediate said first and second ends, each of said lightweight resilient balls having a diameter of sufficient dimension to prevent said chain and its respective hook from contacting the underside of said vehicle while said vehicle is moving by being interposed between the underside of said vehicle and said chain, and contacting the underside of the vehicle during towing.

2. A towing apparatus as in claim 1 wherein each of said resilient lightweight balls is a solid rubber ball having a hole through the center, said chain passing through said hole.

3. A towing apparatus as in claim 1 wherein said means for securing said first ends of each of said chains is a pelican hook which is secured onto a portion of the chain which is wrapped around a portion of said chassis.

* * * * *